_United States Patent Office_

3,014,050
Patented Dec. 19, 1961

3,014,050
CYCLOSTEROID COMPOUNDS AND PROCESS
FOR THEIR MANUFACTURE
Oskar Jeger, Zurich, Switzerland, assignor to Ciba Pharmaceutical Products Inc., Summit, N.J.
No Drawing. Filed July 22, 1959, Ser. No. 828,696
Claims priority, application Switzerland July 29, 1958
16 Claims. (Cl. 260—397.4)

The present invention relates to the manufacture of new cyclosteroid compounds by irradiation of 19-nor-steroids.

According to the present process a 19-nor-steroid whose rings A and B correspond to the formula

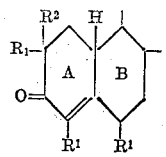

in which $R^1$ represents a hydrogen or halogen atom, for example fluorine or chlorine, or a lower aliphatic hydrocarbon radical, for example a methyl group, and $R^2$ represents a hydrogen atom or an esterified carboxyl group—is irradiated in the absence of air.

The irradiation is advantageously carried out under nitrogen in an organic solvent such as a lower aliphatic or cycloaliphatic hydrocarbon, for example pentane, hexane, cyclohexane; a lower aliphatic or cycloaliphatic alcohol such as methanol, ethanol, propanol, butanol; or a lower aliphatic or cycloaliphatic ether, for example diethyl ether, dioxane; or a carboxylic acid such as acetic acid, propionic acid or butyric acid, in the presence or absence of water. The light used may be artificial or strong natural light. Preferred light is ultraviolet light such as is generated by high-pressure mercury lamps, or strong sunlight. Normally, the treatment is performed at a temperature ranging from —10° to +150° C., though higher or lower temperatures are equally suitable, since it has been observed that the selected temperature has less influence on the course of the reaction than the choice of the solvent and/or the duration of the irradiation.

As is demonstrated by the following diagram of partial formulae, the irradiation according to the present invention produces a mixture of 19-nor-4:10-cyclo-3-ketosteroids and $\Delta^4$-19-nor-3:10-cyclo-3-hydroxysteroids:

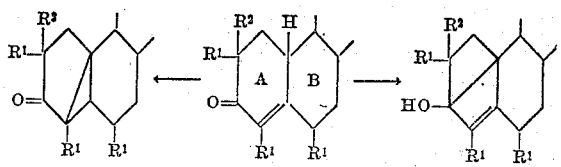

The resulting mixture can be resolved into its constituents by a known method, for example chromatography on neutral alumina or on silica gel.

The 19-nor-steroids used as starting material are derivative of spirostane, furostane, cholane, cholestane, pregnane or androstane and may contain substituents, apart from those in rings A and B, of any desired nature, for example in rings C and D and in the side chain free or functionally converted hydroxyl groups such as acyloxy or alkoxy groups, halogen atoms such as fluorine, chlorine or bromine; free or ketalized oxo groups; free or functionally converted carboxyl groups such as nitrile or esterified carboxyl groups or a lactone group, for example a butenolide group. They may also contain further double bonds. Examples of specific starting materials are the following $\Delta^4$-19-nor-3-keto-steroids: 19-nor-testosterone and 19-nor-4-methyl-testosterone and esters thereof; 19-nor-testosterones containing a lower aliphatic hydrocarbon radical, such as a methyl, ethyl, propyl, butyl, vinyl, ethinyl, allyl, propargyl, methallyl radical in the 17α-position; 19-nor-cortisone, 19-nor-hydrocortisone, 19-nor-11-epihydrocortisone, 19-nor-corticosterone, 19-nor-11-dehydrocorticosterone, 19-nor-cortexone, 19-nor-17α-hydroxy-cortexone, 19-nor-progesterone, 19-nor-11α-, 11β-hydroxy- or -11-keto-progesterone, as well as substitution products thereof that contain in 9α- or 12α-position a fluorine, chlorine or bromine atom and/or in the 16α-position a hydroxyl group.

The products of the present process that contain free hydroxyl and/or oxo groups can be converted by a known method into their functional derivatives such as esters, ethers, enol-esters, enol-ethers, acetals or their appropriate thio-derivatives such as thio-ethers, thio-acetals or esters of thio-acids, furthermore into the hydrazones or oximes. The acid radicals of the esters and enol-esters are those of saturated or unsaturated aliphatic, cycloaliphatic, aromatic or heterocyclic mono- or dicarboxylic acids, of sulfonic acids or of phosphoric, sulfuric or hydrohalic acids. The radicals of the ethers, enol-ethers, acetals or appropriate thio-derivatives may belong to the aliphatic, aromatic or heterocyclic series. Such radicals are, for example, alkyl or alkylene groups such as benzyl-, di- or triphenylmethyl-groups, tetrahydropyranyloxy groups, or sugar radicals such as those of glucose, galactose or maltose.

The cyclosteroids obtained by the present process show an anabolic effect and can be used as medicaments, further as intermediates for the manufacture thereof.

The new compounds can be used as medicaments, for example in the form of pharmaceutical preparations which contain the active substance in admixture with a pharmaceutical organic or inorganic, solid or liquid carrier suitable for enteral or parenteral administration. As carriers such substances come into consideration as do not react with the new compounds, such as for instance water, gelatine, lactose, starch, magnesium stearate, talc, vegetable oils, benzylalcohols, gums, polyalkylene glycols cholesterol or other known carriers. The pharmaceutical preparations can be, in the form, for instance, of tablets or dragees or in liquid form as solutions, suspensions or emulsions. They may be sterilized and/or contain auxiliary substances, such as preserving, stabilizing, wetting or emulsifying agents, salts for the modification of osmotic pressure or buffers. They may also contain other therapeutically useful substances. The preparations are obtained in the customary way.

The following example illustrates the invention.

_Example_

500 mg. of 19-nor-testosterone are dissolved in 100 cc. of dioxane, and the solution is irradiated under nitrogen in a cylindrical quartz vessel provided with a cooling finger, for 5 hours at about 15° C. with a high-pressure quartz burner type Biosol Philips (250 watt), the burner being located at a distance of about 5 to 10 cm. from the reaction vessel. During the irradiation the solution is vigorously stirred with a magnetic stirrer. The solution is processed by being cautiously evaporated at room tempertaure in a water-jet vacuum. The residue—which in the ultra-violet spectrum in ethanol reveals only a broad band at 242 m$\mu$, log $\epsilon$=3.00—is dissolved in 50 cc. of benzene, and the solution is filtered through a column of 50 grams of silica gel. Elution with benzene and with a 100:1-mixture of benzene+ethyl acetate elutes from the column a total of 120 mg. of 19-nor-4:10-cyclo-3-keto-17β-hydroxy-androstane. The product, which is saturated to tetranitromethane, displays in the infra-red spectrum in chloroform bands at 3620 cm.$^{-1}$ (hydroxyl group) and at 1712 cm.$^{-1}$ (carbonyl group). The ultraviolet spectrum in ethanol contains a band at 212 mμ, log ε=3.4.

Elution of the column with ether produces 100 mg. of Δ$^4$-19-nor-3:10-cyclo-3:17β-dihydroxy-androstene which is slightly unsaturated to tetranitromethane. The infrared absorption spectrum of this diol reveals at 3620 cm.$^{-1}$ and 3480 cm.$^{-1}$ the bands of the two hydroxyl groups, but no absorption of a carbonyl group is observed in the area 1600–1700 cm.$^{-1}$. The ultra-violet spectrum in ethanol contains only a final absorption at 195mμ, log ε=4.01. The resulting new cycloandrostane compounds can be esterified by as such known methods.

In analogous manner 19-nor-17α-methyl-testosterone yields 19-nor-4:10-cyclo-3-keto-17α-methyl-17β-hydroxy-androstane and Δ$^4$-19-nor-3:10-cyclo-3:17β-dihydroxy-17α-methyl-androstene.

What is claimed is:

1. Process for the manufacture of new 19-nor-4:10-cyclo-3-keto and Δ$^4$-19-nor-3:10-cyclo-3-hydroxy cyclosteroids selected from the group consisting of those of the spirostane, furostane, cholane, cholestane, pregnane and androstane series, wherein a 19-nor-steroid whose rings A and B correspond to the formula

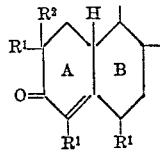

in which R$^1$ represents a member selected from the group consisting of a hydrogen, a halogen atom and a lower alkyl radical and R$^2$ represents a member selected from the group consisting of a hydrogen atom and an esterified carboxyl group, is irradiated in the absence of air.

2. Process as claimed in claim 1, wherein the irradiation is carried out with ultraviolet light under nitrogen.
3. Process as claimed in claim 1, wherein the irradiation is carried out in an ether.
4. Process as claimed in claim 1, wherein 19-nor-testosterone is used as starting material.
5. Process as claimed in claim 1, wherein 19-nor-17α-methyl-testosterone is used as starting material.
6. Process as claimed in claim 1, wherein the irradiation is carried out in an organic solvent.
7. 19-nor-4:10-cyclo-3-keto-17β-hydroxyandrostane.
8. A lower alkane carboxylic acid ester of the compound claimed in claim 7.
9. Δ$^4$-19-nor-3:10-cyclo-3:17β-dihydroxy-androstene.
10. A lower alkane carboxylic acid ester of the compound claimed in claim 9.
11. 19-nor-4:10-cyclo-3-keto-17α-methyl-17β-hydroxyandrostane.
12. A lower alkane carboxylic acid ester of the compound claimed in claim 11.
13. Δ$^4$-19-nor-3:10-cyclo-3:17β-dihydroxy-17α-methylandrostene.
14. A lower alkane carboxylic acid ester of the compound claimed in claim 13.

15. A cyclo steroid selected from the group consisting of 19-nor-testosterone, 17α-lower alkyl-19-nor-testosterone, 17α-lower alkenyl-19-nor-testosterone, 19-nor-cortisone, 19-nor-hydrocortisone, 19-nor-11-epihydrocortisone, 19-nor-corticosterone, 19-nor-11-dehydrocorticosterone, 19-nor-cortexone, 19-nor-17α-hydrocortexone, 19-nor-progesterone, 19-nor-11α-hydroxy-progesterone, 19-nor-11β-hydroxy-progesterone, 19-nor-11-keto-progesterone, 9α-halogen derivatives thereof, wherein the halogen is a member selected from the group consisting of fluorine, chlorine and bromine, 12α-halogen derivatives thereof, wherein the halogen is a member selected from the group consisting of fluorine, chlorine and bromine, 16α-hydroxyl derivatives thereof and lower alkyl esters of these compounds, wherein the A and B rings have the structure

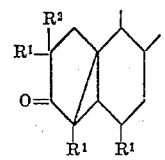

in which R$^1$ represents a member selected from the group consisting of a hydrogen, a halogen atom and a lower alkyl radical and R$^2$ represents a member selected from the group consisting of a hydrogen atom and an esterified carboxyl group.

16. A cyclo steroid selected from the group consisting of 19-nor-testosterone, 17α-lower alkyl-19-nor-testosterone, 17α-lower alkenyl-19-nor-testosterone, 19-nor-cortisone, 19-nor-hydrocortisone, 19-nor-11-epihydrocortisone, 19-nor-corticosterone, 19-nor-11-dehydrocorticosterone, 19-nor-cortexone, 19-nor-17α-hydroxycortexone, 19-nor-progesterone, 19-nor-11α-hydroxy-progesterone, 19-nor-11β-hydroxy-progesterone, 19-nor-11-keto-progesterone, 9α-halogen derivatives thereof, wherein the halogen is a member selected from the group consisting of fluorine, chlorine and bromine, 12α-halogen derivatives thereof, wherein the halogen is a member selected from the group consisting of fluorine, chlorine and bromine, 16α-hydroxyl derivatives thereof and lower alkyl esters of these compounds, wherein the A and B rings have the structure

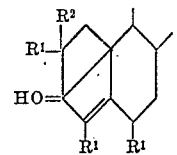

in which R$^1$ represents a member selected from the group consisting of a hydrogen, a halogen atom and a lower alkyl radical, and R$^2$ represents a member selected from the group consisting of a hydrogen atom and an esterified carboxyl group.

References Cited in the file of this patent
UNITED STATES PATENTS

| | | |
|---|---|---|
| 2,774,777 | Djerassi et al. | Dec. 18, 1956 |
| 2,905,676 | Colton | Sept. 22, 1959 |

UNITED STATES PATENT OFFICE
CERTIFICATE OF CORRECTION

Patent No. 3,014,050              December 19, 1961

Oskar Jeger

It is hereby certified that error appears in the above numbered patent requiring correction and that the said Letters Patent should read as corrected below.

Column 1, lines 15 to 21, the formula should appear as shown below instead of as in the patent:

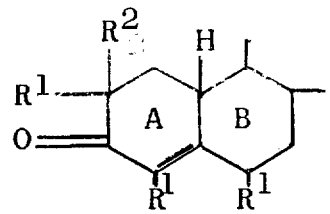

column 2, line 9, for "11β-hydroxy-" read -- -11β-hydroxy- --; column 4, line 6, for "-17α-hydrocortexone" read -- -17α-hydroxycortexone --; lines 45 to 51, the formula should appear as shown below instead of as in the patent:

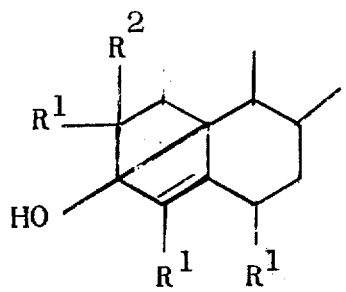

Signed and sealed this 21st day of August 1962.

(SEAL)
Attest:

ESTON G. JOHNSON              DAVID L. LADD
Attesting Officer             Commissioner of Patents